United States Patent [19]

Hessler

[11] Patent Number: 4,506,539

[45] Date of Patent: Mar. 26, 1985

[54] DYNAMIC PRESSURE COMPARATOR

[75] Inventor: Richard O. Hessler, Somerville, Ala.

[73] Assignee: Thiokol Corporation, Chicago, Ill.

[21] Appl. No.: 458,002

[22] Filed: Jan. 14, 1983

[51] Int. Cl.³ ............................................. G01L 27/00
[52] U.S. Cl. ........................................ 73/4 R; 73/756
[58] Field of Search ................................. 73/4 R, 756

[56] References Cited

PUBLICATIONS

Sinusoidal Pressure Generator for Testing Pressure Probes, Ted Nyland, NASA, Proceedings of the 25th Annual ISA Conference, (Oct. 26-29, 1970) S2743, pp. 621–627.

*Primary Examiner*—Gerald Goldberg
*Assistant Examiner*—Vincent P. Kovalick

*Attorney, Agent, or Firm*—Gerald K. White

[57] ABSTRACT

A dynamic pressure comparator for calibrating high frequency pressure transducers used for the measurement of rocket motor combustion instability and other transient phenomena includes an acoustic cylindrical cavity through which a jet stream of nitrogen is passed and at each of the opposite ends of which a transducer carrier is provided. Vortex systems and turbulence created as the jet enters and exits the cavity stimulate pressure transducers that are mounted in the carriers. The outputs of the transducers are monitored and compared as by the use of a spectrum analyzer. The comparator includes adjustments to vary the high frequency stimulus and the cavity pressure, and facilitates simulation of transducer installation in a given pressure measurement application, for example, on a rocket motor.

12 Claims, 6 Drawing Figures

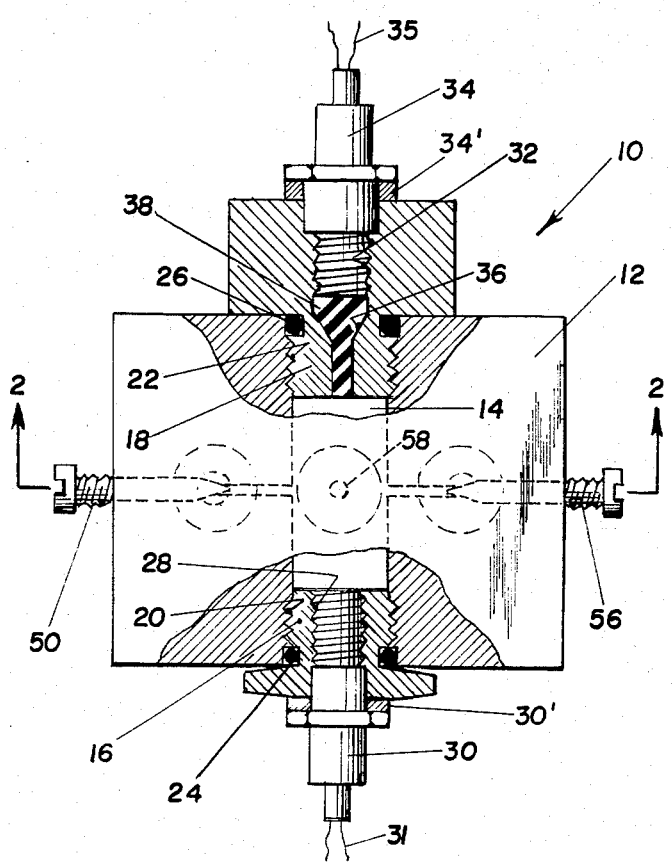
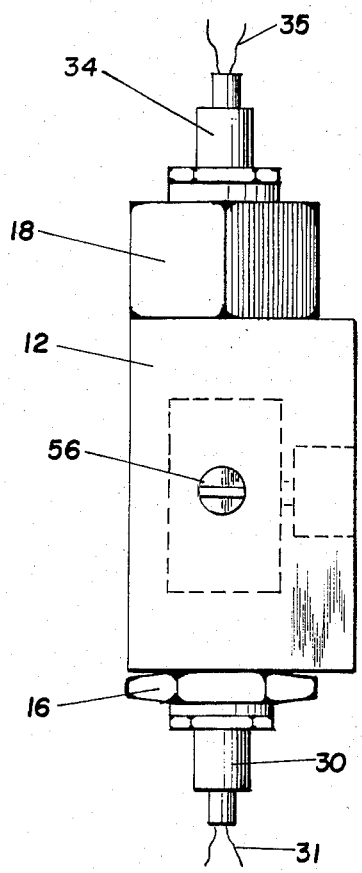
Fig. 1
Fig. 3
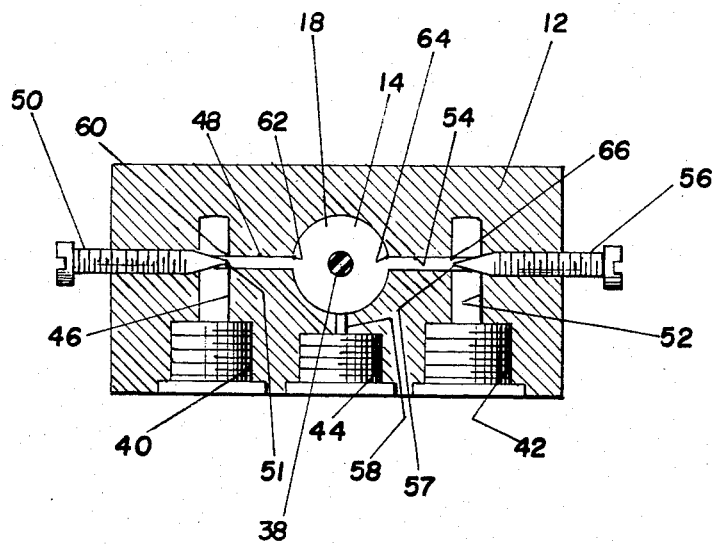
Fig. 2

DYNAMIC PRESSURE COMPARATOR

BACKGROUND OF THE INVENTION

1. Field of the Invention

The present invention relates to an improvement in devices for calibrating high frequency pressure transducers that are used for the measurement of rocket motor combustion instability or other transient phenomena. The invention is particularly useful for calibrating transducers for use in applications where the pressure medium is corrosive or thermally severe, and, as a consequence, the pressure transducer requires a thermal or corrosion protection system.

2. Description of the Prior Art

The gases in a burning rocket motor offer a severe thermal environment in which high frequency pressure transducers for measuring combustion instability or other transient phenomena require protection from melting by recessed mounting and/or thermal coatings such as silicon rubber. Such recessed mounting and protective coatings have an undesired effect, however, in that they alter the response of the transducer to pressure fluctuations in the rocket combustion chamber proper. The error in the altered response may vary from fractions of a percent to orders of magnitude. Although various calibration schemes have been proposed in the prior art, such schemes, in general, have proved to be cumbersome and expensive and have been little used. For the most part, errors due to altered response have been recognized and simply tolerated.

The prior art calibration techniques have involved the use of either "shock" devices or "driven" devices. Although mechanical shock devices have been used, pneumatic shock tubes have been more common. A pneumatic shock tube usually consists of a pressure chamber fitted with a rupture diaphragm. When the diaphragm is ruptured, a shock wave forms that is impacted on the mounted, protected transducer. The transducer may or may not be pressurized to an elevated mean pressure. Shock tubes are generally not readily portable, being either heavy or long, or both. Shock tubes require partial disassembly and replacement of diaphragms and further require expenditure of an appreciable amount of compressed gas for each test.

"Driven" devices based on mechanical vibration of known masses upon a fluid column have been used, but generally have been limited to frequencies below 1 or 2 kHz. Driven acoustic devices have been developed by the National Aeronautics and Space Administration (NASA) and by the United States Air Force.

The NASA development is described in publications of R. E. Robinson entitled: "Improvement of a Large Amplitude Sinusoidal Pressure Generator for Dynamic Calibration of Pressure Transducers," NASA CR-120874, Feb. 1972, and "Dynamic Response of High Frequency Pressure Transducers to Large Amplitude Sinusoidal Pressure Oscillations, " NASA CR-2000, Apr. 1972.

In the NASA device, termed a sinusoidal pressure generator, reference and test pressure transducers attached to an acoustic chamber are stimulated by means of an interrupted stream of air as produced by a perforated rotating disc. Fairly smooth sinusoids produced at low frequencies give way to distorted sinusoids at higher frequencies (3 kHz) that gradually subside into the acoustic noise. In its intended usage, the NASA device suffers a limited frequency range, low portability and moderate compressed gas consumption.

The Air Force device, developed in the late 1970's, consists of a tunable resonant cavity excited by a vibrating membrane pump driven by a piezoelectric disc. The unit combines moderate portability with good high frequency response (20 kHz), but mean pressure capability is limited by the strength of the membrane. In its intended usage, the Air Force device produces very sinusoidal pressure fluctuations, in consequence of which many calibration measurements at different manually-adjusted response frequencies are required in order to describe the frequency response of a transducer and its protection system.

SUMMARY OF THE INVENTION

An object of the invention is to provide a controllable dynamic pressure comparator for the generation of high-frequency pressures to stimulate high-frequency pressure transducers in order to perform comparative calibrations of one transducer assembly with respect to another at elevated mean pressures.

A further object of the invention is to provide such a controllable comparator wherein the generated acoustic pressures contain all frequencies over a wide range such that use of Fourier transform mathematics permits calibration of all frequencies simultaneously.

A more specific object of the invention is to provide an improvement in pressure comparison apparatus for comparing the high frequency response of pressure transducers that are used to measure rocket motor combustion instability or other transient phenomena, in applications where the pressure medium is corrosive or thermally severe and a thermal or corrosion protection system is required.

These and other objects are achieved, in accordance with the present invention, by the simultaneous stimulation of reference and test high frequency pressure transducers, each of which provides an electrical output corresponding to the stimulation. An air-jet is used to introduce acoustic energy into a high frequency acoustic cavity into each of the ends of which is installed a transducer carrier. Screw jet or needle valves are provided in the cavity inlet and outlet passageways. Vortex systems and turbulence created as the jet enters and exits the cavity stimulate transducers mounted in the transducer carriers. Adjustment of the screw jet valves provides control of both the cavity pressure and the center frequency. Pressure amplitude variations are not directly controllable, being the natural result of the vortex generation process coupled to the cavity. One of the transducer carriers is arranged to flush mount the reference transducer, which desirably may be factory calibrated, to serve as a baseline or transfer standard. The other transducer carrier may be arranged to mount the test installation, including transducer, port geometry and thermal protection to simulate, as closely as possible, the installation of a given pressure measurement application, for example, the installation on a rocket motor.

Comparison of transducer response may be accomplished by dual-channel spectral analysis and in other ways, if desired, as known to those skilled in the art. The transfer function formed between averaged simultaneous spectra from each of the transducers embodies the ratio of the two frequency response curves confounded with the spatial (but not temporal) variation of acoustic energy at the transducer carrier faces. The structure of the comparator is symmetrical to minimize spatial variation and the use of transducer carriers permits reversing locations to average out the remaining spatial variation.

BRIEF DESCRIPTION OF THE DRAWINGS

Having summarized the invention, a detailed description follows with reference being had to the accompanying deawings which form part of the specification, of which:

FIG. 1 is a partially fragmented top plan view of the pressure comparator of the present invention showing reference and test high frequency pressure transducers mounted in carriers or adapters, the reference transducer carrier being mounted flush with an internal acoustic cavity and the test transducer carrier being configured to simulate the port design and thermal protection of a given application;

FIG. 2 is a cross sectional view of the pressure comparator of FIG. 1 taken along the lines 2—2;

FIG. 3 is an end elevational view of the pressure comparator of FIG. 1;

DESCRIPTION OF THE PREFERRED EMBODIMENTS

Figure 4:
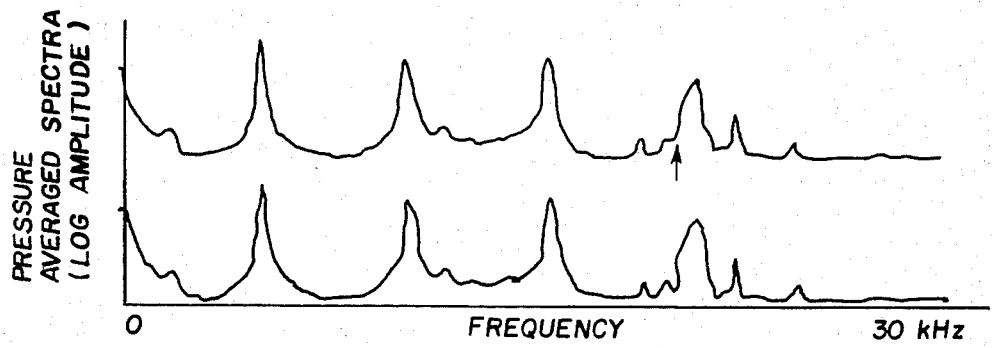
FIG. 4 is a graphical illustration showing a comparison of multiple analyses on a single pressure transducer during a period of flow adjustment.

As shown in the drawings, the controllable dynamic pressure comparator 10 of the present invention includes a body or housing member 12 having a high frequency cylindrical acoustic cavity 14 formed therein. Cavity 14 is closed at one end by a hollow carrier or adapter 16 and is closed at the other end by a hollow carrier or adapter 18. Carriers 16 and 18 each have the form of a bushing the external screw threads of which are screwed into respectively associated tapped openings 20 and 22 that are located in the opposite ends of body 12, in alignment with each other and the cylindrical cavity 14. A sealing ring 24 seals carrier 16 in opening 20. A similar sealing ring 26 seals carrier 18 in opening 22.

Internal screw threads 28 in carrier 16 are provided for mounting a reference high frequency pressure transducer 30 to the comparator 10. Similarly, internal screw threads 32 in carrier 18 are provided to mount a high frequency pressure transducer 34 that is under test to the comparator 10. Gaskets 30' and 34' are provided for sealing the transducers 30 and 34 respectively. Internal threads 28 extend to the inner end of carrier 16 whereby reference transducer 30 may be flush mounted as shown, that is, with the inner end of transducer 30 positioned to be flush with the associated end of cylindrical cavity 14. Internal threads 32 extend part way only to the inner end of carrier 18, the inner end of the opening in carrier 18 being tapered to provide a port 36 which, for example, may be funnel shaped as shown in the drawing, and having a cylindrical portion of smaller diameter at the associated end of cavity 14. In accordance with the invention, the space including port 36 between the associated end of cavity 14 and the end of the pressure transducer 34 under test may be filled with thermal protection means 38 such as silicon rubber or other suitable material to simulate the installation of a given application such as on a rocket motor.

High frequency pressure transducers 30 and 34 may be of known type providing a fluctuating electrical output on output electrical conductors 31 and 35 corresponding to the acoustical vibrations to which the respective transducers are exposed. Output conductors 31 and 35 may be connected to a spectrum analyzer of known type (not shown).

Also included in body 12, as seen in FIG. 2, are three tapped openings 40, 42 and 44. Opening 40 comprises a pressure supply port which may be connected externally to a source of gas pressure such, for example, as a commercially bottled nitrogen source. Port 40 is connected internally of body 12 to cavity 14 by an inlet T-shaped cylindrical passageway comprising a bar portion 46 and a stem portion 48, the stem portion 48 intersecting the bar portion 46 and the internal wall surface of cavity 14 midway the ends thereof. Intersecting the passageway bar portion 46 is a jet screw or needle valve 50 that extends into the adjacent end of stem portion 48 and is adjustable externally of body 12 to control the flow of gas from pressure supply port 40 into the cavity 14.

Opening 42 comprises an exhaust port which may be connected to atmospheric pressure. Port 42 is connected internally of body 12 to cavity 14 by an exit T-shaped cylindrical passageway comprising a bar portion 52 and a stem portion 54, the stem portion 54 intersecting the bar portion 52 and the internal wall surface of cavity 14. The region of intersection of stem portion 54 with the internal wall surface of cavity 14 is diametrically opposite that of stem portion 48 and in alignment therewith. Intersecting the passageway bar portion 52 is a jet screw or needle valve 56 that extends into the adjacent end of stem portion 54 and is adjustable externally of body 12 to control the flow of gas out of cavity 12 through to the exhaust port 42.

Opening 44 is a mean pressure measurement port which may be connected to a suitable pressure measuring means or gauge (not shown). Port 44 is connected by a small passageway 58 to cavity 14, the opening of passageway 58 into cavity 14 being in the same plane as the openings of passageway stem portions 48 and 54 into the cavity 14, but angularly spaced 90° C. therefrom, as seen in FIG. 2. While the port 44 and passageway 58 are shown on the same side of comparator 10 as the ports 40 and 42, as seen in FIG. 2, the port 44 and passageway 58 may be located on the opposite side, that is, the top side, if desired, with the passageway 58 still in the same plane as passageways 48 and 54.

From the foregoing description, it is seen that the comparator 10 according to the present invention, includes a high frequency acoustic cavity 14 through which a stream of gas is adapted to be passed. In its passage from the pressure supply port 40 to the exhaust port 42, the pressure drops are controlled by the two externally adjustable jet screws 50 and 56. As a result, the pressure in the acoustic cavity 14, as measured by way of the mean pressure measurement port 44, is fully controllable from supply pressure down to atmospheric pressure. The jet screws 50 and 56 may also be adjusted to control the gas flow rate through the system, and thereby the local gas velocities within the system.

In accordance with the invention, the passageway stem portion 48 through which the gas enters the acoustic cavity 14 is provided with a sharp corner at the entrance 60 to the stem portion 48 and at the exit 62 therefrom. Similarly, the stem portion 54 through which the gas exits the cavity 14 is provided with a sharp corner at the entrance 64 to the stem portion 54 and at the exit 66 therefrom. Additionally, the ends 51 and 57 of each of the respective jet screws 50 and 56, which are generally conical in form as shown, are cut off to have sharp edges. As the gas passes each of these sharp corners, vortex systems and/or turbulence are created with frequencies depending on local velocity and size. Each sharp edge operates to produce a different frequency vortex or turbulence for a given flow rate.

In this manner, the total oscillatory energy is distributed as evenly as possible across as wide a frequency range as possible, enabling simultaneous calibration of a broad frequency band with a minimum ratio of resonance to anti-resonance amplitudes.

The pressure intensity of the vortexes and/or turbulence is convected and radiated into the acoustic cavity 14, setting up both standing wave and travelling wave acoustic patterns consistent with the mode frequencies of the acoustic cavity 14 and of the passageway stem portions 48 and 54 themselves. The passageway stem portions 48 and 54 desirably are designed for mode frequencies that are integral multiples of the cavity mode frequency to enhance high frequency capability. The pressure amplitudes are amplified at frequencies near the acoustic mode frequencies and stimulate the pressure transducers 30 and 34 installed in the respective transducer carriers 16 and 18.

With the gas stream entering and exiting the middle region of the cylindrical cavity 14, as shown in the drawings, and with the transducers 30 and 34 located at the ends of the cavity 14, system volume is minimized, and consequently, pressure amplitude is maximized for a given gas flow rate.

The pressure transducers 30 and 34 may be mounted in a carrier or adapter which may be flush, as illustrated by carrier 16, or configured to simulate the port design and thermal protection of a given application as illustrated by carrier 18, and particularly, the funnel shaped port 36 therein filled with silicon rubber 38. In each case, the installed location of the carrier presents the associated transducer diaphragm or simulated port at a fixed position with respect to the gas entrance to the cavity 14 to permit interchange of transducers for multiple calibrations without changing system settings.

The overall system arrangement can be optimized for high sensitivity to certain frequency bands or can be optimized for broad stimulus. External dimensions of the dynamic pressure comparator 10 are not important. The internal dimensions, per se, are not important, but the selection of and relationship between internal dimensions is, to some extent, in order to effect a distribution of vortex energy as evenly as possible across as many frequencies as possible and to avoid having local acoustic resonances from reinforcing each other. In this manner, large pressure amplitudes at any single frequency may be avoided, and as a consequence, comparisons at many frequencies may be made at the same time.

By way of illustration and not limitation, it is noted that in an operative embodiment of the invention wherein body 12 and the carriers 16 and 18 are made from milled steel having external dimensions of 1.50 ×2.25×3.00 inches (3.81×5.74×7.62 cm.) and weighing three pounds (1.36 kg), a sensitivity of three pounds per square inch peak to peak (psipp) (0.21 kg. per square cm. peak to peak) is easily achieved at the mode frequencies of 50 kHz. At the anti-resonances, the signal was down only by a factor of 10 permitting better than 10% resolution across the full frequency range. Using commercially bottled nitrogen, mean pressure may easily be adjusted to 1500 psig (10.5 kg. per square cm.).

In the above-mentioned operative embodiment of the invention, the length and diameter of the cylindrical cavity 14 are 1.36 and 0.66 inches (3.45 and 1.68 cm.), respectively, the passageway stem portion 48 has a length of 0.20 inches (0.51 cm.) a diameter of 0.093 inches (0.236 cm.), and the passageway stem portion 54 has a length of 0.245 inches (0.622 cm.) and a diameter of 0.104 inches (0.264 cm.). The carriers 16 and 18 may each be formed from one inch mild steel hex stock. As seen in the plane view of FIG. 1, the cavity 14 is centrally located in body 12 with each of the ends spaced a distance of 0.45 inches (1.14 cm.) from the associated side of body 12.

Calibrations performed to check out the pressure comparator 10 have demonstrated that the pressure of the acoustic cavity 14 is easily controllable from just below supply pressure down to slightly above atmospheric by manipulating the adjusting jet screws 50 and 56. Except at very low chamber pressure settings, several pounds per square inch stimulation was available in the vicinity of the acoustic modes.

Consumption of the commercially available bottled nitrogen that was used as the gas supply source was found to be very low at 500 psig and at 1000 psig chamber pressure—on the order of 20 minutes calibration time from a single cylinder.

Figure 5:
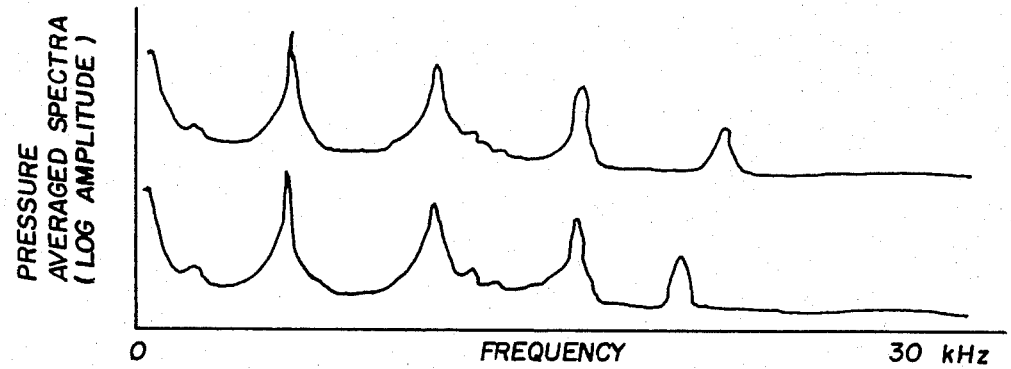
FIG. 5 graphically illustrates the output magnitudes of two transducers during a period of flow adjustment.

Using a single channel spectrum analyzer, and spectrum averaging, about one-half second of data obtained by means of the pressure comparator 10 of the present invention produced the smooth single channel spectra shown in the graphical illustrations of FIGS. 4 and 5.

In FIG. 4, there is shown a comparison of two separate analyses of the output magnitude of a single transducer during a period of flow adjustment. These two runs were selected from a series of six trials to show the worst difference between runs. Except for the narrow frequency band indicated by the arrow at about 19 kHz, the precision of measurement and analysis combined is shown to be better than ±2.4% of reading for pressures ranging from 0.010 to 0.5 pounds per square inch peak to peak (psipp). This is actually slightly better than the analyzer resolution alone, indicating that the precision of the transducer, instrumentation and tape electronics is very good.

There is shown in FIG. 5 a graphical comparison of the output magnitudes of two transducers during a period of flow adjustment. Agreement between the two transducers is shown to be better than ±5% up to 10 kHz. By 14 kHz, major differences (60%) exist between the two measurements. The differences appear to be associated with the peak at 19 kHz on one transducer. This peak appears to be outside of the acoustic system and is believed to be due to a mechanical resonance in the transducer carrier assembly which includes a thin silicon rubber coating (0.04 inch) bonded to the transducer diaphragm for thermal protection.

Figure 6:
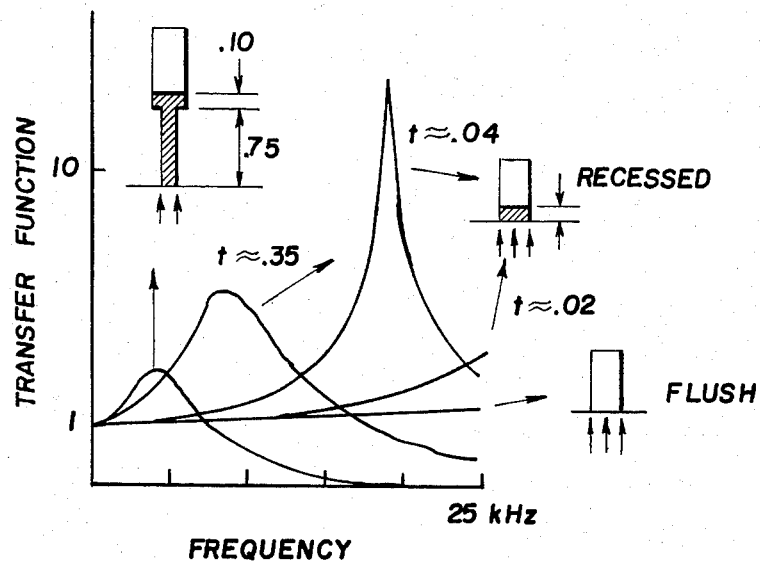
FIG. 6 is a graphical illustration summarizing results with respect to the effects of different port and thermal protection arrangements.

The graphs of FIG. 6 summarize results with respect to the effects of transducer port configuration and thermal protection upon high frequency pressure measurements. As there illustrated, a 0.02 inch silicon rubber coating on the transducer diaphragm almost doubles response at 25 kHz. For a 0.04 inch coating, a resonant peak (gain of 20) is observed at 19 kHz. A layer of rubber 0.35 thick shifts the resonant peak to 8 kHz (gain of 3). Above the peak, gain is reduced 20% by 25 kHz. A recessed port design, filled with silicon rubber, further reduced the peak to 4 kHz.

Characteristic features of the controllable device or pressure comparator of the present invention are:

1. Vortex and turbulence generation are used to stimulate broad frequency ranges simultaneously.
2. The broad frequency range, coupled with conventional Fourier transform mathematics, are used to extract calibration data across the same broad frequency range simultaneously.
3. High frequency capability; tests show good signal to 50 kHz.
4. Large amplitude signals; tests show 3 psi peak to peak at resonances.
5. High mean pressure; model operable at 5,000 psi, easily adjustable to supply pressure.
6. Extreme portability; size 1½×2¼×3 inches, weight 3 pounds.
7. Low compressed gas consumption; 10 SCFM flow rates. Data analysis indicates less than 10 seconds of data are required for full frequency calibration, 100 to 200 calibrations can be performed on one bottle of compressed gas.

Thus, there has been provided according to the present invention a dynamic pressure comparator having particular utility in calibrating high frequency pressure transducers and for demonstrating the effects of port configuration and thermal protection arrangements. The comparator includes a small acoustic cavity through which a strema of nitrogen is passed. Vortex systems and turbulence created as the jet enters and exits the cavity stimulate the transducers. The outputs of the transducers, which is electrical in form, are monitored and compared using a spectrum analyzer. The comparator includes adjustments to vary the cavity pressure and facilitates simulation of the installation for the measurement of a given transient phenomena such as mean rocket motor combustion chamber pressure and to vary the high frequency stimulus.

The dynamic pressure comparator of the present invention significantly improves the credibility of measurements of combustion instability, particularly the certainty with which it may be asserted that a given rocket motor arrangement meets the desired combustion instability specifications with respect to maximum pressure amplitudes.

What is claimed is:
1. A dynamic pressure comparator comprising
   body means having a gas flow inlet port, a gas flow outlet port, and a third port,
   acoustical cavity providing means included in said body means for providing an acoustical cavity, said acoustical cavity providing means including a first transducer carrier and a second transducer carrier, said first and second transducer carriers being disposed in spaced relationship with said acoustical cavity therebetween,
   said body means further including a first passageway connecting said inlet port to a first region of said cavity, a second passageway connecting said outlet port to a second region of said cavity, and a third passageway connecting said third port to a third region of said cavity, said first, second and third regions being in substantially the same plane midway between said first and second transducer carriers with a portion of each of said first and second passageways being in alignment with each other, and
   adjustable gas flow restriction means included in each of said aligned portions of said first and second passageways.

2. A dynamic pressure comparator as specified in claim 1 wherein said adjustable gas flow restriction means includes a jet screw in each of said aligned portions of said first and second passageways.

3. A dynamic pressure comparator as specified in claim 2 wherein said acoustical cavity is cylindrical in form with said first transducer carrier disposed at one end thereof and said second transducer carrier disposed at the other end thereof, and with said portions of said first and second passageways positioned diametrically opposite each other.

4. A dynamic pressure comparator as specified in claim 3 wherein the third region of said cavity to which said third passageway is connected is displaced approximately 90° with respect to each of said first and second regions.

5. A dynamic pressure comparator as specified in claim 4 wherein each of said first and second passageways are T-shaped with the stem thereof comprising said portion thereof, and wherein both ends of each of said stems have sharp edges, and wherein each of said jet screws includes a tapered part that is positioned in adjustable relation with an associated end of one of said portions that is remote from said cavity, the end of each of said tapered parts having a sharp edge.

6. A dynamic pressure comparator as specified in claim 5 wherein the first of said transducer carriers is arranged to flush mount a reference transducer carried thereby, and the second of said transducer carriers is arranged to mount a test transducer carried thereby to simulate the installation of a given pressure measurement application.

7. A dynamic pressure comparator as specified in claim 6 wherein the second of said transducer carriers includes a recessed port containing a thermal protection medium.

8. A dynamic pressure comparator as specified in claim 6 wherein said first and second transducer carriers are interchangeable.

9. A dynamic pressure comparator as specified in claim 5 wherein the relationship between internal dimensions of said cavity and the stem portions of said T-shaped passageways is selected to effect a distribution of Vortex energy as evenly as possible across as many frequencies as possible to avoid having local acoustic frequencies from reinforcing each other.

10. A dynamic pressure comparator as specified in claim 9 wherein the stem portions of said T-shaped passageways are cylindrical in cross section and have relative lengths and diameters such that they are effective to generate mode frequencies that are integral multiples of the cavity mode frequencies thereby to enhance capability.

11. A dynamic pressure comparator as specified in claim 10, wherein said cylindrical cavity has a length of 1.36 inches and a diameter of 0.66 inches,
   wherein one of said cylindrical stem portions has a length of 0.20 inches and a diameter of 0.093 inches, and
   wherein the other of said cylindrical stem portions has a length of 0.245 inches and a diameter of 0.104 inches.

12. A dynamic pressure comparator comprising body means having a gas flow inlet port, a gas flow outlet port, and a third port, acoustical cavity providing means included in said body means for providing an acoustical cavity, said acoustical cavity providing means including a first transducer carrier and a second transducer carrier, said first and second transducer carriers being disposed in spaced relationship with said acoustical cavity therebetween and said second transducer carrier including a recessed port containing rubber, said body means further including a first passageway connecting said inlet port to a first region of said cavity, a second passageway connecting said outlet port to a second region of said cavity, and a third passageway connecting said third port to a third region of said cavity, said first, second and third regions being in substantially the same plane midway said first and second transducer carriers with a portion of each of said first and second passageways being in alignment with each other, and adjustable gas flow restriction means included in each of said aligned portions of said first and second passageways, wherein the third region of said cavity to which said third passageway is connected is displaced approximately 90° with respect to each of said first and second regions, and wherein each of said first and second passageways are T-shaped with the stem thereof comprising said portion thereof, and wherein both ends of each of said stems have sharp edges, and wherein each of said jet screws includes a tapered part that is positioned in adjustable relation with an associated end of one of said portions that is remote from said cavity, the end of each of said tapered parts having a sharp edge.

* * * * *